United States Patent Office 2,722,529
Patented Nov. 1, 1955

2,722,529

AMIDES OF CERTAIN 1-AMINOALKYL-4-PHENYL PIPERAZINES AND SALTS

Robert W. Fleming, Grosse Pointe Woods, and Robert F. Parcell, Detroit, Mich., assignors to Parke, Davis & Company, Detroit, Mich., a corporation of Michigan No Drawing. Application October 26, 1951, Serial No. 253,454

13 Claims. (Cl. 260—268)

This invention relates to substituted phenyl piperazine compounds having valuable therapeutic properties and to methods for obtaining the same. More particularly, the invention relates to substituted phenyl piperazine compounds having the formula

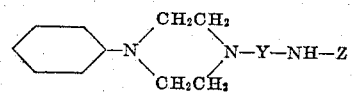

wherein Y represents a straight or branched chain alkylene group containing two to six carbon atoms inclusive and Z represents an acyl, sulfonyl, or carbamyl group. For example, the group Z may be an acyl group derived from a lower aliphatic carboxylic acid, a halogen substituted lower aliphatic carboxylic acid, benzoic acid, a substituted benzoic acid or phenyl acetic acid; a sulfonyl group such as a lower alkyl sulfonyl group or a benzenesulfonyl group; or a carbamyl group. Due to their basic nature these new substituted piperazines form acid addition salts with both inorganic and organic acids. Some examples of such salts are the hydrochloride, hydrobromide, sulfate, sulfamate, acetate, phosphate, oxalate and benzoate salts.

In accordance with the invention, substituted phenyl piperazine compounds having the above formula are produced by reacting a 1-(aminoalkyl)-4-phenyl piperazine of formula

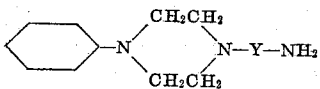

where Y has the same significance as given above; with a reagent capable of converting the primary amino group to an amide group. For example, in the case of the carboxylic acid acyl products suitable reagents are the carboxylic acids themselves and their esters, halides and anhydrides, in the case of the sulfonyl products the sulfonyl halides are used as the reagent while in the case of the ureido products an alkyl isocyanate or an alkali metal cyanate is used.

When preparing the carboxylic acid amide products using the ester or acid type of acylating agents, the reaction is carried out under anhydrous conditions and the reactants simply heated together for a short period of time. When the halides or anhydrides of carboxylic acids are used as the acylating agents, the reaction can be carried out under either aqueous or anhydrous conditions. When using aqueous conditions, it is preferable to use a basic catalyst such as sodium hydroxide, sodium acetate, sodium bicarbonate and the like. When using anhydrous conditions solvents such as ether, benzene, toluene, xylene and the like may be employed.

As stated above, the sulfonamide products are prepared using a sulfonyl halide as the acylating agent. The reaction can be carried out under either anhydrous or aqueous conditions. When using aqueous conditions best results are obtained if the reaction is carried out in the presence of a basic catalyst such as sodium hydroxide, sodium carbonate, sodium bicarbonate and the like. The reaction under anhydrous conditions is generally carried out in a solvent such as benzene, xylene, toluene, ether and the like and by employing two equivalents of the 1-(aminoalkyl)-4-phenyl piperazine.

In carrying out the reaction between the alkyl isocyanate with the 1-(aminoalkyl)-4-phenylpiperazine compound, an anhydrous reaction medium is used while an aqueous acid medium is employed with the alkali cyanates. In either case the reaction is carried out at about room temperature.

The products of the invention possess a high degree of sympatholytic activity and some of them also exhibit a hypotensive effect. For therapeutic purposes the products can be used in the free base or acid addition salt form and administered by either the oral or parenteral routes.

The invention is illustrated by the following examples.

*Example 1*

A mixture consisting of 21.9 g. of 1-(3-aminopropyl)-4-phenylpiperazine and 100 cc. of ethyl formate is heated under reflux for two hours. The excess ethyl formate is removed by distillation and the residue recrystallized from benzene and petroleum ether to obtain the desired N-[3-(4-phenyl-1-piperazyl)propyl] formamide in pure form; yield, 8 g.; M. P. 100–1° C. The formula of this compound is,

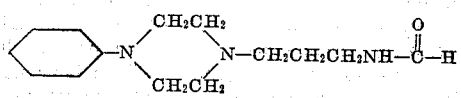

The hydrochloride salt of N-[3-(4-phenyl-1-piperazyl)-propyl] formamide is prepared by dissolving 2 g. of the free base in ether and bubbling an excess of dry hydrogen chloride through the solution. The precipitated hydrochloride salt is collected and purified by recrystallization from anhydrous ethanol.

*Example 2*

A solution consisting of 21.9 g. of 1-(3-aminopropyl)-4-phenylpiperazine, 15.7 g. of methyl dichloroacetate and 100 cc. of methanol is heated under reflux for one hour. The methanol is removed by distillation under reduced pressure and the residue stirred with petroleum ether. The solid product is collected and purified by recrystallization from benzene and petroleum ether to obtain the desired α,α-dichloro-N-[3-(4-phenyl-1-piperazyl)propyl] acetamide in pure form; yield, 22 g.; M. P. 81–2° C. The formula of this compound is,

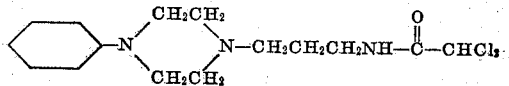

*Example 3*

A solution of 11.4 g. of methanesulfonylchloride in 300 cc. of benzene is added slowly to a solution of 44 g. of 1-(3-aminopropyl)-4-phenylpiperazine in 300 cc. of benzene with stirring. After the addition has been completed, the reaction mixture is refluxed for thirty minutes, chilled and filtered. The filtrate is concentrated to a volume of 100 cc. and diluted with petroleum ether. The solid product is collected and purified by recrystallization from benzene and petroleum ether to obtain the desired N-[3-(4-phenyl-1-piperazyl)propyl] methanesulfonamide in pure form; yield, 16 g.; M. P. 105–7° C. The formula of this compound is,

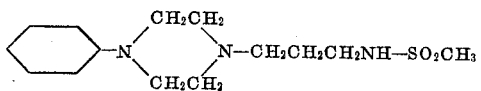

5 g. of N-[3-(4-phenyl-1-piperazyl)propyl] methanesulfonamide is dissolved in anhydrous ether and the resulting solution treated with an excess of dry hydrogen bromide. The solid salt is collected and purified by recrystallization from alcohol to obtain the desired N-[3-(4 - phenyl - 1 - piperazyl)propyl] methanesulfonamide monohydrobromide in pure form; M. P. 172–4° C.

*Example 4*

8 g. of benzoyl chloride is added in small portions with shaking to a suspension of 11 g. of 1-(3-aminopropyl)-4-phenylpiperazine in 150 cc. of 10% sodium hydroxide solution. The shaking is continued until the odor of benzoyl chloride disappears and then the mixture extracted with benzene. The benzene extract is dried and diluted with petroleum ether. The solid product is collected and recrystallized twice from benzene and petroleum ether to obtain the desired N-[3-(4-phenyl-1-piperazyl)-propyl] benzamide in pure form; yield, 10 g.; M. P. 109–10° C. The formula of this compound is,

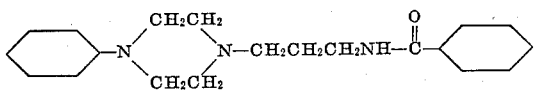

*Example 5*

A mixture consisting of 27.7 g. of 1-(5-aminoamyl)-4-phenylpiperazine, 10 g. of formic acid and 200 cc. of diisopropyl benzene is heated under reflux, removing the water as it is formed. After the evolution of water has ceased, the reaction mixture is refluxed for an additional fifteen minutes and then the solution cooled. Dilution with petroleum ether causes an oil to separate which is removed and dissolved in benzene. The benzene solution is concentrated and diluted with petroleum ether which causes the desired product to separate in solid form. The product is collected and purified by recrystallization from benzene and petroleum ether to obtain the desired N-[5-(4-phenyl-1-piperazyl)amyl] formamide in pure form; yield, 5 g.; M. P. 65–7° C. The formula of this compound is,

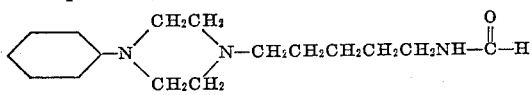

*Example 6*

A mixture consisting of 35 g. of 1-(3-aminopropyl)-4-phenylpiperazine, 250 cc. of glacial acetic acid and 30.6 g. of acetic anhydride is heated under reflux for two hours. Most of the acetic acid is removed from the reaction mixture by distillation in vacuo and the residue neutralized with sodium carbonate solution. The reaction mixture is extracted with benzene, the benzene extracts concentrated and diluted with petroleum ether. The solid product (37 g.) is collected and purified by recrystallization from benzene and petroleum ether to obtain the desired N-[3-(4-phenyl-1-piperazyl)propyl] acetamide in pure form; yield, 20 g.; M. P. 100–2° C. The formula of this compound is,

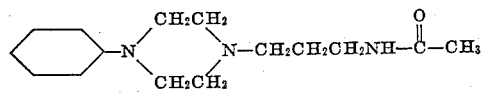

*Example 7*

A mixture consisting of 21.9 g. of 1-(3-aminopropyl)-4-phenylpiperazine and 8.11 g. of potassium cyanate is dissolved in 50 cc. of water containing 12 g. of glacial acetic acid and the solution allowed to stand at room temperature for several days. At the end of this time 9.2 g. of sodium bicarbonate is added and most of the water removed by distillation under reduced pressure. The residue is chilled and filtered to obtain a precipitate which upon recrystallization from absolute alcohol and petroleum ether yields 12 g. of the desired [3-(4-phenyl-1-piperazyl)propyl] urea; M. P. 146–8° C. The formula of this compound is,

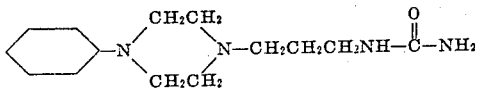

*Example 8*

A mixture consisting of 21.9 g. of 1-(2-aminopropyl)-4-phenylpiperazine, 30 g. of acetic anhydride and 100 cc. of glacial acetic acid is heated under reflux for about two hours. Most of the acetic acid is removed by distillation in vacuo and the residue made alkaline with sodium carbonate solution. The aqueous solution is extracted with benzene, the benzene extracts concentrated and diluted with petroleum ether. The solid product is collected and purified by recrystallization from benzene and petroleum ether to obtain the desired N-[2-(4-phenyl-1-piperazyl)isopropyl] acetamide in pure form; yield, 18 g.; M. P. 96–8° C. The formula of this compound is,

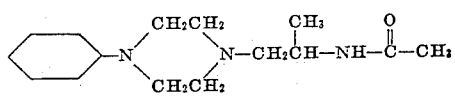

*Example 9*

A mixture consisting of 43.8 g. of 1-(3-aminopropyl)-4-phenylpiperazine, 25.6 g. of cyclohexylcarboxylic acid and 100 cc. of diisopropyl benzene is heated under reflux removing water as it is formed. After the evolution of water has ceased, the reaction mixture is cooled, and diluted with petroleum ether. The oil which precipitates is treated with a sodium carbonate solution and the alkaline solution extracted with benzene. The benzene extract is dried, concentrated to a small volume and diluted with petroleum ether. The solid product is collected and purified by recrystallization from benzene and petroleum ether to obtain the desired N-[3-(4-phenyl-1-piperazyl)propyl] cyclohexylcarboxamide in pure form; yield, 47 g.; M. P. 112–4° C. The formula of this compound is,

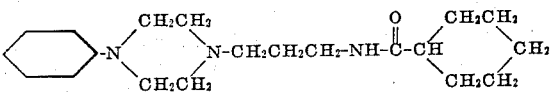

*Example 10*

A mixture consisting of 43.8 g. of 1-(3-aminopropyl)-4-phenylpiperazine, 39.6 g. of 6-cyclohexylcaproic acid and 100 cc. of diisopropyl benzene is heated under reflux with a water separator until no more water is formed. The reaction mixture is cooled, diluted with petroleum ether and the oil which separates collected. The oil is treated with sodium carbonate solution and extracted with benzene. The benzene extract is dried, concentrated to a small volume and diluted with petroleum ether. The solid product is collected and purified by recrystallization from benzene and petroleum ether to obtain the desired 6-cyclohexyl-N-[3-(4-phenyl-1-piperazyl)-propyl] caproamide in pure form; yield, 65 g.; M. P. 90–1° C. The formula of this compound is,

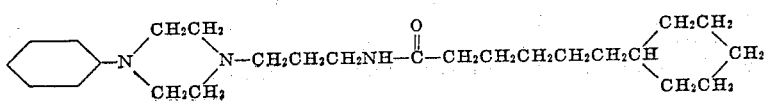

Example 11

A mixture consisting of 21.9 g. of 1-(3-aminopropyl)-4-phenylpiperazine, 13.6 g. of phenyl acetic acid and 50 cc. of diisopropyl benzene is heated under reflux with a water separator until no further water is formed. The reaction mixture is cooled, diluted with petroleum ether and the oil which precipitates separated and treated with sodium carbonate solution. The aqueous mixture is extracted with benzene, the benzene extract dried, evaporated to a small volume and diluted with petroleum ether. The solid product is separated and purified by recrystallization from benzene and petroleum ether to obtain the desired N-[3-(4-phenyl-1-piperazyl)-propyl]-phenyl acetamide in pure form; yield, 30 g.; M. P. 127–9° C. The formula of this compound is,

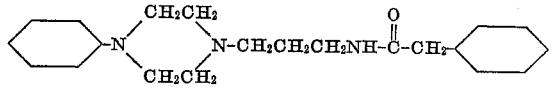

Example 12

20 g. of benzene sulfonyl chloride is added in small portions with shaking to a suspension of 21.9 g. of 1-(3-aminopropyl)-4-phenylpiperazine in 100 cc. of water containing 15 g. of sodium carbonate. Shaking is continued until the reaction is complete and the mixture extracted with benzene. The benzene extract is dried, diluted with petroleum ether and the precipitate collected. The product is purified by recrystallization from benzene and petroleum ether to obtain the desired N-[3-(4-phenyl-1-piperazyl)propyl] benzene sulfonamide; yield, 31 g.; M. P. 114–6° C. The formula of this product is,

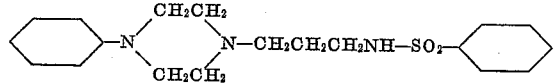

Some further examples of the products which can be prepared according to the methods described above are:

N-[2-(4-phenyl-1-piperazyl)ethyl] formamide—M. P. 95–6° C.

N-[2-(4-phenyl-1-piperazyl)ethyl] acetamide—M. P. 105–7° C.

N - [3 - (4-phenyl-1-piperazyl)propyl] propionamide- M. P. 81–2° C.

N-[4-(4-phenyl-1-piperazyl)butyl] acetamide—M. P. 107–8° C.

N-[5-(4-phenyl-1-piperazyl)amyl] acetamide—M. P. 86–7° C.

N - [4 - (4-phenyl-1-piperazyl)butyl] methane sulfonamide—M. P. 80–1° C.

N - [5 - (4 - phenyl-1-piperazyl)amyl] methane sulfonamide—M. P. 103–5° C.

What we claim is:

1. An acid addition salt of a compound of formula

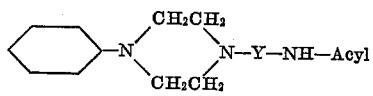

wherein Acyl is a lower aliphatic carboxylic acid acyl radical and Y is an alkylene group containing two to six carbon atoms inclusive.

2. An acid addition salt of a compound of formula

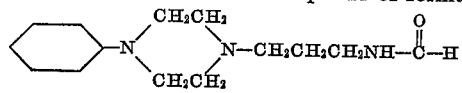

3. A compound of the formula

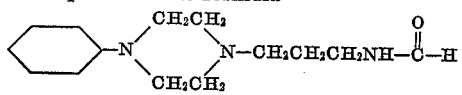

4. An acid addition salt of a compound of formula

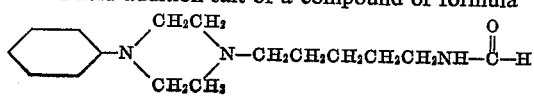

5. A compound of the formula,

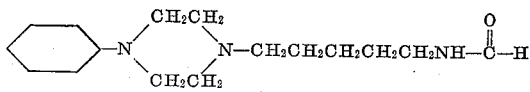

6. An acid addition salt of a compound of formula

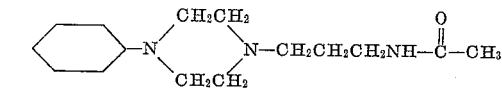

7. A compound of the formula,

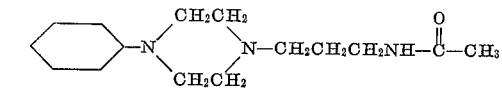

8. A compound of the formula

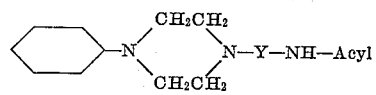

wherein Acyl is a lower aliphatic carboxylic acid acyl radical and Y is an alkylene group containing two to six carbon atoms inclusive.

9. A compound of the formula

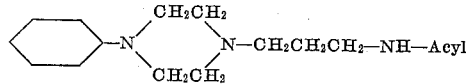

wherein Acyl is a lower aliphatic carboxylic acid acyl radical.

10. An acid addition salt of a compound as defined in claim 9.

11. A compound of the class consisting of a free base and its acid addition salts, said free base having the formula,

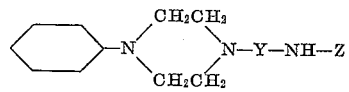

wherein Y is an alkylene group containing two to six carbon atoms inclusive and Z is a member of the class consisting of lower aliphatic carboxylic acid acyl, halogen substituted lower aliphatic carboxylic acid acyl, benzoyl, phenylacetyl, sulfonyl, and carbamyl.

12. Process for the production of a secondary amide compound having the formula,

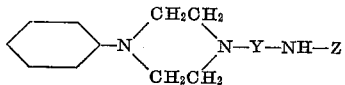

which comprises reacting a 1 - (aminoalkyl) - 4 - phenyl piperazine of formula,

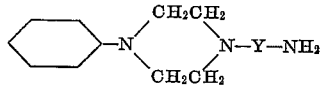

with a reagent capable of converting the primary amino group to a secondary amide group; where Y is an alkylene group containing two to six carbon atoms inclusive and Z is a member of the class consisting of lower aliphatic carboxylic acid acyl, halogen substituted lower aliphatic carboxylic acid acyl, benzoyl, phenylacetyl, sulfonyl and carbamyl.

13. Process according to claim 12 wherein said reagent is a compound selected from the class consisting of carboxylic acids, esters of carboxylic acids, carbonyl halides, anhydrides of carboxylic acids, sulfonyl halides, alkyl isocyanates and alkali metal cyanates.

References Cited in the file of this patent

Van Alphen: Rec. Trav. Chim., 56, 1009 (1937).
Cerkovnikov: Archiv Za Keniju (Archiv Kem.) 18, 32 (1946).